3,218,251
REFINING OF LUBRICATING OILS

Jacques Demeester, Paris, France, assignor to The British Petroleum Company Limited, London, England, a British joint-stock corporation
No Drawing. Filed Mar. 19, 1962, Ser. No. 180,876
Claims priority, application France, Apr. 11, 1961, 858,412
7 Claims. (Cl. 208—264)

This invention relates to the treatment of lubricating oils.

In the production of lubricating oils, it is necessary to give the oils a finishing treatment in order to give them a satisfactory colour and appearance and satisfactory heat and storage stability. The finishing treatment must not bring about any substantial change in the molecular structure of the oil, in particular there must be no appreciable drop in viscosity.

The finishing treatment that has been employed for many years consists in contacting the oil at high temperature with activated clay or percolating the oil through a fixed bed of granular clay. Both these treatments have the disadvantage that they involve the handling of large quantities of solid matter while the disposal of spent clay is an additional disadvantage of the contact process. Some lubricatnts require acid treatment in addition to clay treatment and in this case the disposal of acid tar is a further embarrasment.

Catalytic reforming process have made available large quantities of gases rich in hydrogen, thus rendering economically attractive methods of refining by means of hydrogen, and the use of a mild hydrogen treatment as an alternative to acid and/or clay treatment is being adopted on an increasing scale. The process is called hydrofinishing.

A catalyst commonly employed in the hydrofinishing process comprises the oxides of cobalt and molybdenum incorporated with an activated alumina support. This catalyst is capable of giving the desired colour but does not always give a sufficient stability and this difficulty is more apparent in the case of oils which have not been solvent refined and which usually need to treatment with sulphuric acid and clay. We have previously discovered that improved results with respect to the colour stability of the finished oils may be obtained by using a catalyst comprising the oxides of iron, cobalt and molybdenum incorporated with an activated alumina support.

It has been found that the optimum content of iron oxide is in the region of 14–15% wt. of the catalyst and the preparation of catalysts containing this amount of iron oxide on an activated alumina base presents certain practical difficulties. It has been established that the most active catalysts are obtained if an alumina base prepared from an alumina hydrate consisting wholly or largely of trihydrate is impregnated with a solution of an iron salt from which the iron oxide is subsequently derived and the impregnation of the alumina support with such quantities of iron salt solution is not an easy matter.

It has now been found that good results may be obtained by using a catalyst in which the oxides of cobalt and molybdenum are incorporated with a mixture of the oxides of iron and magnesium prepared by coprecipitation.

According to the invention therefore, a process of producing lubricating oils having improved colour and oxidation stability comprising treating the oils with hydrogen at elevated temperature and pressure in the presence of a catalyst consisting of the oxides of cobalt and molybdenum incorporated with a mixture of the oxides of iron and magnesium prepared by coprecipitation.

The content of iron oxide should be in excess of 10% by wt. of the catalyst and the best results are obtained with a content in the range 25 to 45% wt. The ratio of magnesium oxide to iron oxide is not critical but the best results are obtained with a ratio in the region of 2:1. The content of the oxides of cobalt and molybdenum is similarly not critical but the best results are obtained in all cases with a ratio of molybdenum oxide to cobalt oxide of at least 3.

When treating lubricating oils containing an appreciable quantity of sulphur, it is desirable to operate at sufficiently low temperature to avoid an undue reduction in the viscosity of the oil. Temperatures in the range 150 to 340° C. have been found to be suitable for such sulphur-containing oils, preferably 250 to 320° C.

The pressure may vary between 5 ats. and 80 ats. but in practice one will use a pressure corresponding to the pressure of the hydrogen-rich gases from catalytic reforming processes which may be at 20 to 30 ats. The hydrogen feed rate is also variable but low, being from 5 to 150 volumes per volume of oil under normal conditions. A preferred value is in the region of 23 vols. per vol. of oil. The feed rate can vary from 0.5 to 6 vols. of oil per vol. of catalyst per hour, the higher values being suitable for solvent-refined oils.

In all cases the catalyst according to the invention can be sulphided before use.

The improvements to be obtained by the use of a catalyst according to the present invention are illustrated by the following experiments.

The experiments were carried out on an oil from Kuwait crude that had not been solvent refined and had the following properties:

| | |
|---|---|
| Density | 0.914 |
| Viscosity Engler at 50° C. | 2.4 |
| Kinematic viscosity at 100° F. | 25.3 |
| Kinematic viscosity at 122° F. | 15.5 |
| Kinematic viscosity at 210° F. | 4.12 |
| Viscosity index | 45.8 |
| Ramsbottom carbon, percent wt. | 0.07 |
| Flash point, ° C. | 200 |
| Pour point, ° C. | −24 |
| Acidity mgr./KOH/gr. | 0.212 |
| Colour A.S.T.M. | 2½ |

The following catalysts were used for the treatment of the above oil.

TABLE 1

| Catalyst | Composition | | | | Ratio $MoO_3/CoO$, wt. | Ratio $Fe_2O_3/MgO$, mol |
|---|---|---|---|---|---|---|
| | $MoO_3$ | $CoO$ | $Fe_2O_3$ | $MgO$ | | |
| 198 | 9.2 | 3.1 | 70.3 | 17.4 | 3 | 1 |
| 264 | 6 | 2 | 61 | 31 | 3 | 0.5 |
| 265 | 9 | 3 | 58.5 | 28.5 | 3 | 0.5 |
| 266 | 4 | 2 | 75.1 | 18.9 | 2 | 1 |
| 267 | 6 | 2 | 73.6 | 18.4 | 3 | 1 |
| 268 | 8 | 2 | 72 | 18 | 4 | 1 |
| 269 | 9 | 3 | 70.5 | 17.5 | 3 | 1 |
| 270 | 12 | 4 | 67.2 | 16.8 | 3 | 1 |
| 271 | 6 | 2 | 82 | 10 | 3 | 2 |
| 272 | 9 | 3 | 78.5 | 9.5 | 3 | 2 |
| 289 | 9 | 3 | 44 | 44 | 3 | 0.25 |
| 290 | 9 | 3 | 29 | 59 | 3 | 0.12 |
| 294 | 9 | 3 | 18 | 70 | 3 | 0.06 |
| 295 | 9 | 3 | 10 | 78 | 3 | 0.03 |
| 301 | 9 | 3 | 5 | 83 | 3 | 0.015 |

These catalysts were prepared in the following manner:

(a) Preparation of the support

Ferric nitrate and magnesium sulphate are dissolved in suitable proportions in the minimum quantity of water. The mixture is brought to the boil and is poured slowly into a boiling solution of caustic soda (350 grammes/litre) in a slight excess over the theoretical proportions.

The precipitate is filtered and washed until sulphate ions have disappeared. The cake is dried for 10 hours at 80° C. and calcined for 4 hours at 550° C. It is finally broken up and screened to a granular size of 1.3 mm.

(b) *Impregnation of support*

The calculated quantity of ammonium molybdate solution is poured on to the prepared support. After drying for 10 hours at 80° C., the support is impregnated with cobalt nitrate solution. The preparation is completed by a second drying for 10 hours at 80° C. and a final calcination for 4 hours at 550° C.

The catalysts were tested under the following standard conditions:

Pressure _____ 20 kg./cm².
Space velocity _____ 1 v./v./hr.
Hydrogen rate _____ 25 vols. per vol. of oil.
Concurrent flow of oil and hydrogen.

Each test was begun at 350 C° and the temperature lowered progressively to 250° C.

The results obtained are set out in the following Table No. 2.

TABLE 2

| Cat. | Property | Operating Temperature, ° C. | | | | | | Optimum temp. | Optimum property |
|---|---|---|---|---|---|---|---|---|---|
| | | 350 | 325 | 300 | 275 | 250 | 225 | | |
| 198 | Colour A.S.T.M | 2− | 1½− | 1½− | 1½− | 2− | 2− | 305 | 0.32 |
| | Colour density | 0.62 | 0.44 | 0.33 | 0.47 | 0.61 | 0.74 | 286 | 0.10 |
| | Colour density increase | 0.20 | 0.16 | 0.12 | 0.20 | 0.40 | 0.60 | | |
| 264 | Colour A.S.T.M | 1½− | 1½− | 1½− | 1½− | 1½− | 1½− | 290 | 0.30 |
| | Colour density | 0.44 | 0.38 | 0.32 | 0.32 | 0.35 | 0.38 | 265 | 0.09 |
| | Colour density increase | 0.32 | 0.25 | 0.19 | 0.11 | 0.12 | 0.16 | | |
| 265 | Colour A.S.T.M | 1½− | 1½− | 1½− | 1½− | 1½− | 1½− | 290 | 0.30 |
| | Colour density | 0.40 | 0.36 | 0.32 | 0.32 | 0.34 | 0.36 | 270 | 0.09 |
| | Colour density increase | 0.30 | 0.23 | 0.17 | 0.10 | 0.11 | 0.14 | | |
| 266 | Colour A.S.T.M | 1½− | 1½− | 1½− | 2− | 2− | 2− | 335 | 0.34 |
| | Colour density | 0.38 | 0.35 | 0.47 | 0.60 | 0.72 | 0.84 | 320 | 0.12 |
| | Colour density increase | 0.15 | 0.12 | 0.20 | 0.32 | 0.44 | 0.56 | | |
| 267 | Colour A.S.T.M | 1½− | 1½− | 1½− | 1½− | 2− | 2− | 305 | 0.31 |
| | Colour density | 0.44 | 0.37 | 0.33 | 0.46 | 0.58 | 0.71 | 290 | 0.10 |
| | Colour density increase | 0.25 | 0.19 | 0.13 | 0.17 | 0.31 | 0.45 | | |
| 268 | Colour A.S.T.M | 1½− | 1½− | 1½− | 2− | 2− | 2− | 335 | 0.33 |
| | Colour density | 0.36 | 0.35 | 0.45 | 0.56 | 0.66 | 0.77 | 310 | 0.10 |
| | Colour density increase | 0.13 | 0.11 | 0.12 | 0.34 | 0.66 | 0.98 | | |
| 269 | Colour A.S.T.M | 2− | 1½− | 1½− | 1½− | 2− | 2 | 300 | 0.31 |
| | Colour density | 0.60 | 0.44 | 0.32 | 0.49 | 0.66 | 0.84 | 290 | 0.11 |
| | Colour density increase | 0.15 | 0.14 | 0.12 | 0.26 | 0.55 | 0.85 | | |
| 270 | Colour A.S.T.M | 1½− | 1½− | 1½− | 1½− | 1½ | 2− | 305 | 0.31 |
| | Colour density | 0.40 | 0.35 | 0.33 | 0.42 | 0.51 | 0.61 | 290 | 0.10 |
| | Colour density increase | 0.15 | 0.13 | 0.11 | 0.14 | 0.26 | 0.70 | | |
| 271 | Colour A.S.T.M | 1½− | 1½− | 1½− | 1½− | 1½− | 2− | 310 | 0.33 |
| | Colour density | 0.37 | 0.34 | 0.34 | 0.38 | 0.48 | 0.57 | 300 | 0.12 |
| | Colour density increase | 0.16 | 0.14 | 0.12 | 0.16 | 0.22 | 0.40 | | |
| 272 | Colour A.S.T.M | 1½− | 1½− | 1½− | 1½− | 1½− | 2− | 310 | 0.33 |
| | Colour density | 0.37 | 0.34 | 0.34 | 0.38 | 0.46 | 0.56 | 300 | 0.11 |
| | Colour density increase | 0.30 | 0.19 | 0.11 | 0.12 | 0.15 | 0.39 | | |
| 289 | Colour A.S.T.M | 1½− | 1½− | 1½− | 1½− | 1½− | 1½− | 280 | 0.29 |
| | Colour density | 0.45 | 0.39 | 0.39 | 0.30 | 0.37 | 0.43 | 260 | 0.07 |
| | Colour density increase | 0.33 | 0.21 | 0.19 | 0.12 | 0.08 | 0.11 | | |
| 290 | Colour A.S.T.M | 2− | 1½− | 1½− | 1½− | 1½− | 2− | 285 | 0.30 |
| | Colour density | 0.54 | 0.45 | 0.36 | 0.34 | 0.46 | 0.56 | 255 | 0.06 |
| | Colour density increase | 0.24 | 0.19 | 0.15 | 0.10 | 0.10 | 0.26 | | |
| 294 | Colour A.S.T.M | 2− | 1½− | 1½− | 1½− | 1½− | 1½− | 290 | 0.30 |
| | Colour density | 0.49 | 0.41 | 0.33 | 0.32 | 0.34 | 0.36 | 265 | 0.07 |
| | Colour density increase | 0.36 | 0.28 | 0.19 | 0.10 | 0.10 | 0.15 | | |
| 295 | Colour A.S.T.M | 1½− | 1½− | 1½− | 1½− | 1½− | 1½− | 305 | 0.30 |
| | Colour density | 0.35 | 0.32 | 0.30 | 0.31 | 0.33 | 0.34 | 295 | 0.07 |
| | Colour density increase | 0.30 | 0.20 | 0.10 | 0.11 | 0.15 | 0.19 | | |

The effect of varying the ratio of molybdenum oxide to cobalt oxide for the same content of iron oxide and magnesium oxide is shown in the following Table No. 3.

TABLE 3

| Catalyst | Composition by weight | | | | MoO₃ to CoO | Optimum temperature | Optimum colour increase |
|---|---|---|---|---|---|---|---|
| | MoO₃ | CoO | Fe₂O₃ | MgO | | | |
| 266 | 4 | 2 | 75.1 | 18.9 | 2 | 320 | 0.12 |
| 267 | 6 | 2 | 73.6 | 18.4 | 3 | 290 | 0.10 |
| 268 | 8 | 2 | 72 | 18 | 4 | 320 | 0.10 |
| 269 | 9 | 3 | 70.5 | 17.5 | 3 | 290 | 0.11 |
| 270 | 12 | 4 | 67.2 | 16.8 | 3 | 290 | 0.10 |

It will be seen from Table 3 that the best results are obtained with a weight ratio of molybdenum oxide to cobalt oxide in the region of 3:1.

The effect of varying the weight ratio of iron oxide to magnesium oxide at the same content of molybdenum oxide and cobalt oxide is shown in the following Table No. 4.

TABLE 4

| Catalyst | Content of Fe₂O₃ and MgO | | Optimum temperature | Optimum colour increase |
|---|---|---|---|---|
| | Fe₂O₃ | MgO | | |
| 272 | 78.5 | 9.5 | 300 | 0.11 |
| 269 | 70.5 | 17.5 | 290 | 0.11 |
| 265 | 58.5 | 28.5 | 270 | 0.09 |
| 289 | 44 | 44 | 260 | 0.07 |
| 290 | 29 | 59 | 255 | 0.06 |
| 294 | 18 | 70 | 265 | 0.07 |
| 295 | 10 | 78 | 295 | 0.07 |

It will be seen that better results are obtained when the amount of magnesium oxide by weight is at least equal to the weight of iron oxide, the best result being obtained with a weight ratio of magnesium oxide to iron oxide of 2:1.

The colour of the oil is expressed by reference to what is called the "colour density." The oil must be sold to a maximum colour specification which is fixed as the objective of the finishing treatment. The "colour density" is a comparative measure of the colour of the oil with reference to this specification. The sample of which it is desired to measure the colour is placed in a comparative colorimeter of the Duboscq type opposite a sample having a colour corresponding to the maximum commercial specification.

The "colour density" is expressed by the ratio of the heights of oil giving an equal absorption. A calibrated electric photo-colorimeter is used to read the colour density directly.

The colour stability is expressed by the "increase in colour density" which is measured by the difference between the colour density of the oil before and after an ageing test carried out under standardised conditions. The method of ageing is as follows.

10 cc. of the oil are placed in a cylinder of defined dimensions identical to that required for the ageing test of the British Air Ministry, Method IP.48. The tube is closed by a piece of cotton in order to protect the sample from dust. It is then placed in a bath maintained at 85° C. and is left there for 16 hours. After this time, the cylinder is withdrawn from the bath and allowed to cool. The colour density of the aged oil is determined as for the new oil by means of the calibrated photo-colorimeter.

I claim:

1. A process of producing lubricating oils having improved color and oxidation stability which comprises treating the oils with hydrogen at a temperature within the range 150 to 340° C. and at a pressure within the range 5 to 80 atmospheres in the presence of a catalyst consisting of cobalt oxide and molybdenum oxide incorporated with a support consisting essentially of a mixture of iron oxide and magnesium oxide, said support mixture having been prepared by coprecipitation and containing iron oxide in the range 25–45% by weight of total catalyst, the ratio of magnesium oxide to iron oxide by weight being at least 1:1.

2. A process according to claim 1, wherein the ratio of magnesium oxide to iron oxide by weight is in the region of 2:1.

3. A process according to claim 1, wherein the ratio of molybdenum oxide to cobalt oxide by weight is at least 3.

4. A process according to claim 1, wherein the temperature is within the range 250 to 320° C.

5. A process according to claim 1, wherein the pressure is within the range 20 to 30 ats.

6. A process according to claim 1, wherein the hydrogen feedrate is within the range 5 to 150 volumes per volume of oil.

7. A process according to claim 1, wherein the oil feedrate is within the range 0.5 to 6 vols. of oil per volume of catalyst per hour.

References Cited by the Examiner
UNITED STATES PATENTS

| | | | |
|---|---|---|---|
| 2,706,167 | 4/1955 | Harper et al. | 208—264 |
| 3,020,228 | 2/1962 | Demeester | 208—216 |

ALPHONSO D. SULLIVAN, *Primary Examiner.*

UNITED STATES PATENT OFFICE
CERTIFICATE OF CORRECTION

Patent No. 3,218,251                      November 16, 1965

Jacques Demeester

It is hereby certified that error appears in the above numbered patent requiring correction and that the said Letters Patent should read as corrected below.

Column 1, line 43, for "need to treatment" read -- need to be treated --; columns 3 and 4, TABLE 2, under the heading "Optimum temp.", line 2 thereof, for "286" read -- 285 --.

Signed and sealed this 27th day of December 1966.

(SEAL)
Attest:

ERNEST W. SWIDER                      EDWARD J. BRENNER
Attesting Officer                         Commissioner of Patents